United States Patent [19]

Bronson et al.

[11] Patent Number: 4,621,535

[45] Date of Patent: Nov. 11, 1986

[54] FORWARD ENGAGEMENT AND REVERSE DISENGAGEMENT DEVICE

[75] Inventors: Bruce A. Bronson; Brian C. Preston, both of Anaheim, Calif.

[73] Assignee: Sanders Associates, Inc., Nashua, N.H.

[21] Appl. No.: 756,547

[22] Filed: Jul. 19, 1985

[51] Int. Cl.[4] .................... F16H 57/00; F16H 35/00
[52] U.S. Cl. ........................................ 74/405; 74/384
[58] Field of Search ............... 74/384, 405, 406, 810, 74/812, 380; 226/188

[56] References Cited

U.S. PATENT DOCUMENTS

| 638,194 | 11/1899 | Arnold | 74/405 |
| 1,279,501 | 9/1918 | Bijur | 74/405 |
| 1,373,558 | 4/1921 | Guttinger | 74/405 |
| 2,175,086 | 10/1939 | Mitchell | 74/405 |
| 2,191,332 | 2/1940 | Wardwell | 74/405 |
| 2,506,562 | 5/1950 | Wait | 74/812 |

FOREIGN PATENT DOCUMENTS 2901087  7/1979  Fed. Rep. of Germany ........ 74/810

Primary Examiner—Lawrence Staab
Attorney, Agent, or Firm—Louis Etlinger; Wm. F. Porter, Jr.

[57] ABSTRACT

A drive roll 14 carries a gear (60) that engages a reversing gear (58) driven by a planetary gear (56) on a pivot arm (50). The planetary gear (56) is driven by a sun gear (48) that rotates about the pivot axis of the pivot arm (50) and in turn is driven ultimately by a motor (30). A unidirectioal roller clutch (52) is connected between the pivot arm (50) and the sun gear (48) so as to permit relative rotation between the sun gear and the pivot arm in one direction but prevent it in the other direction. As a result, when the sun gear (48) is driven in one direction, it permits the pivot arm to remain in the position in which the planetary gear (56) engages the reversing gear (58). When the sun gear (48) is driven in the other direction, on the other hand, the pivot arm (50) is caused to pivot with rotation at the sun gear (48) to bring the planetary gear (56) out of engagement with the reversing gear (58). The drive roll (14) is therefore driven by the motor (14) wen the motor operates in one direction but is decoupled from the motor (14) when the motor is operated in the other direction.

6 Claims, 4 Drawing Figures

FORWARD ENGAGEMENT AND REVERSE DISENGAGEMENT DEVICE

BACKGROUND OF THE INVENTION

The present invention is directed to drive mechanisms for web material. It is concerned particularly with such mechanisms in which a power source drives the web material in one direction but is disengaged when the web material is to be drawn in the other direction.

In devices such as electrostatic printer-plotters, a drive roll driven by a motor draws web material such as paper from a supply roll past a printing mechanism in a forward direction. Occasionally, it is desired to rewind the web material in a reverse direction, and it is beneficial for the drive-roll motor to be decoupled from the drive roll during this time so that the drag of the motor does not present a load to the rewinding mechanism.

Mechanisms for achieving this result have been used in the past. For instance, electrically activated solenoids have been used to couple the motor to the drive roller for forward driving and to decouple the motor for rewinding. For small printers, however, the power required to operate the solenoid is significant, so it is preferable to avoid the use of solenoids.

Other prior-art devices have avoided solenoids by using an arrangement in which a pivot arm carries one of the gears in the drive train. The pivot arm pivots between two positions. In one position, the gear that it carries engages the next gear in the train to drive the roll. In the other position, the carried gear is spaced from the above-mentioned next gear. It is thus decoupled from that gear in the other position, although it may engage a gear in another drive train. By frictionally engaging the pivot arm with a shaft or gear in the drive train, operation of the motor in one direction causes the pivot arm to pivot so as to cause engagement of the gear that it carries, while rotation of the motor in the opposite direction causes disengagement.

This arrangement enables the motor and drive roll to be decoupled by simply reversing the motor. However, although such an arrangement eliminates the need to provide power to a solenoid, the friction between the pivot arm and the drive train increases the load on the motor when the motor drives the drive roll.

SUMMARY OF THE INVENTION

The present invention uses a unidirectional clutch to avoid the frictional drag of prior-art devices that decouple a motor from a drive roll automatically by simply reversing the motor, disengaging the motor or coupling the motor to a second drive roll. The present invention, like certain prior-art devices, includes a drive roll mounted on a chassis. The drive-roll has a drive-roll gear on it by which it can be driven, and a pivot arm is pivotably mounted on the chassis and carries a planetary gear rotatably mounted on it so that the pivot arm pivots to bring the planetary gear into and out of coupling with the drive-roll gear. A sun gear driven by a motor rotates about the pivot axis of the pivot arm and engages the planetary gear. The motor therefore drives the drive roll if the pivot arm is in the position in which the planetary gear is coupled to the drive-roll gear.

According to the present invention, a unidirectional clutch is operatively connected between the pivot arm and the drive gear to couple the pivot arm to the sun gear. The unidirectional clutch decouples the sun gear from the pivot arm when the sun gear rotates in the direction in which it is to cause the drive roll to rotate in its forward driving direction. When the sun gear is driven in the other direction, the unidirectional clutch couples it to the pivot arm, which pivots in the direction in which it disengages the planetary gear from the next gear in the drive train and thus decouples the motor from the drive roll. In this way, the motor can be disengaged from the drive roll by simply reversing it, but operation of the motor in the forward direction to drive the drive roll does not involve significant friction between the motor and the pivot arm.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
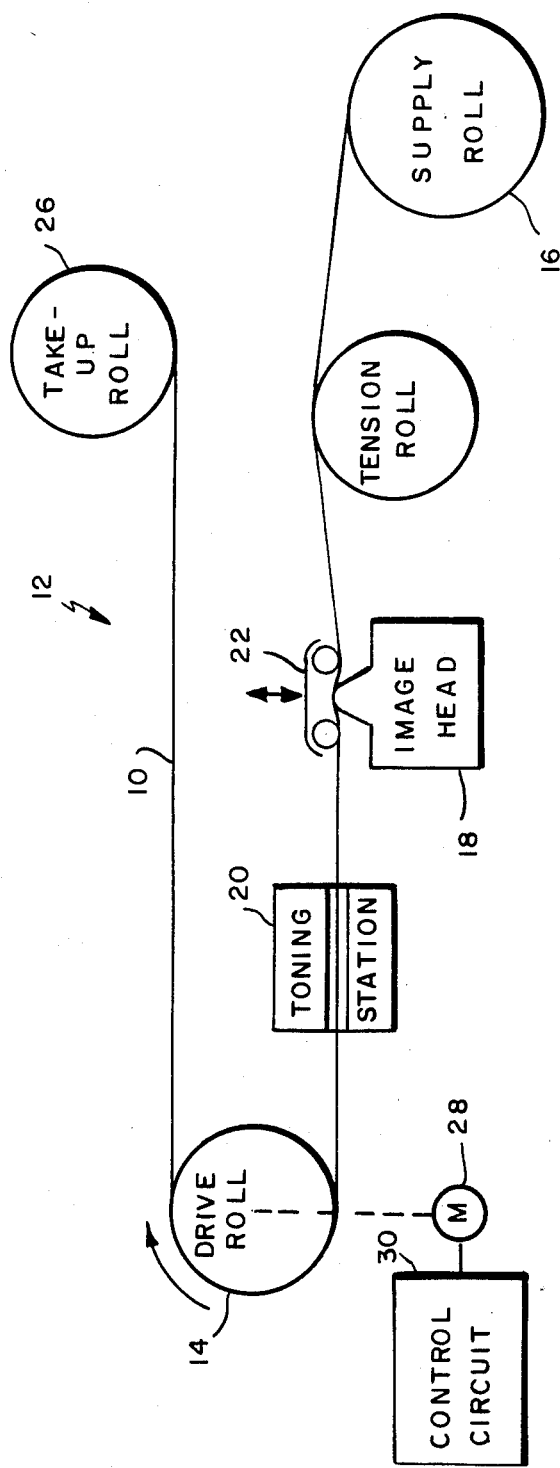
FIG. 1 is a schematic representation of an electrostatic printer-plotter in which the drive mechanism of the present invention is employed.

FIG. 1 illustrates the path that a paper web 10 takes in an electrostatic printer-plotter 12. A drive roll 14, driven by a drive mechanism that will be described in more detail below, pulls paper from a supply roll 16 past an electrostatic plotting mechanism. The plotting mechanism includes an image head 18 for imparting a charge pattern to the paper. The plotting mechanism also includes a toning station 20, which applies toner to the paper with accordance with the pattern laid down by the image head 18.

A pair of head rollers in a retractable head-roller mechanism 22 urges the paper into contact with the image head 18, and a tensioning roller 24 insures that the proper tension is maintained on the web. A take-up roll 26 receives the imprinted paper and is driven for that purpose by a small motor (not shown).

It is sometimes necessary to roll the paper back onto the supply roll. For this purpose, drive means not shown drive the supply roll 16 in the reverse direction. During this time, the head-roller mechanism 22 is moved out of contact with the paper 10 so that the paper 10 no longer engages the image head 18. At the same time, the drive mechanism is disengaged from the drive roll so that the drive roll 14 is allowed to rotate backwards (counterclockwise in FIG. 1) without also being loaded by the inertia and internal friction of the drive-mechanism motor.

In the particular mechanism described in the specification, a motor 28 is operated by a control circuit 30 to rotate in a forward direction when the paper 10 is to be driven forward. When the motor is to be disengaged from the drive roll 14, the control circuit 30 pulses the motor briefly in the reverse direction, and this causes disengagement of the motor from the drive roll 14, as will be described in connection with FIGS. 2, 3, and 4.

Figure 2:
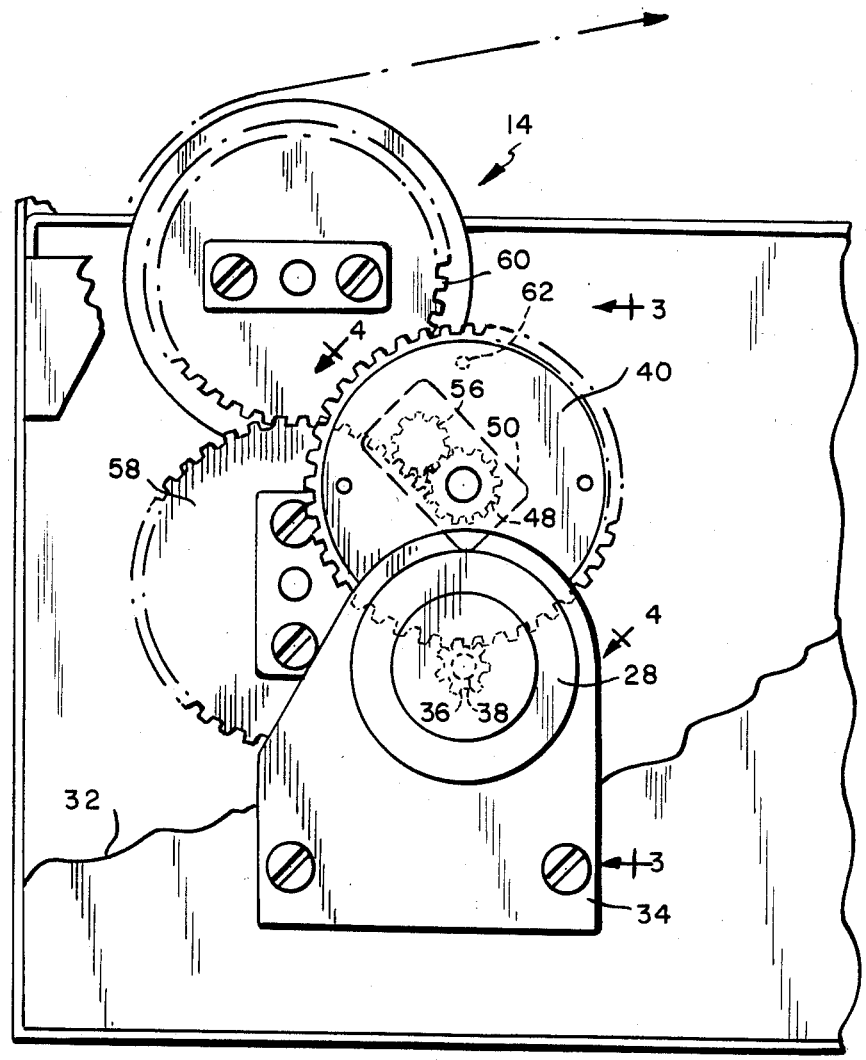
FIG. 2 is a side elevation, with parts broken away, of the portion of the printer-plotter that includes the drive mechanism of the present invention.
Figures 3, 4:
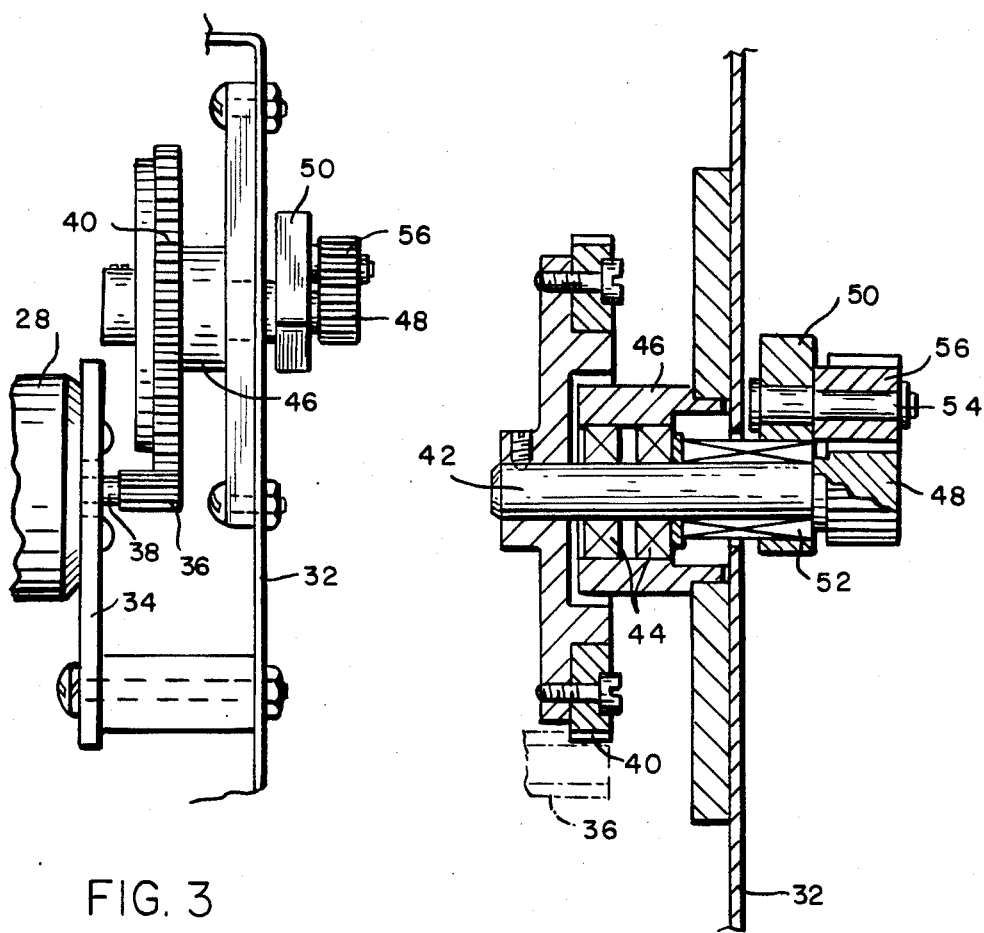
FIG. 3 is a cross-sectional view, with parts removed, taken at lines 3—3 of FIG. 2.
FIG. 4 is a cross-sectional view, with parts removed, taken at lines 4—4 of FIG. 2.

FIG. 2 depicts the chassis 32 of the printer-plotter with a motor bracket 34 mounted on it. The motor 28 is mounted on the motor bracket 34. As can be appreciated by simultaneous reference to FIGS. 2 and 3, a first drive gear 36 is mounted on the shaft 38 of the motor 28 and engages a second gear 40. The second gear 40, as can be seen in FIG. 4, is keyed to a shaft 42, which is supported by bearings 44 in a sleeve 46 mounted on the chassis 32. Also keyed to shaft 42 is a sun gear 48 disposed on the side of the chassis wall opposite the second gear 40. The second and sun gears thus rotate together.

A pivot arm 50 is pivotably mounted on the shaft 42 by a unidirectional roller clutch 52. This clutch may, for instance, be the Torrington roller clutch designated by product number ICB-061014-FS. The pivot arm 50 is provided with a support pin 54 on which a planetary gear 56 is rotatably mounted. As shown in FIG. 4, the sun gear 48 engages the planetary gear 56 when the pivot arm 50 is in the position shown. The sun gear 48 engages the planetary gear 56 in all other positions as well since the sun gear 48 rotates about the pivot axis of the pivot arm 50.

Shown in FIG. 2 but not in FIGS. 3 and 4 is a reversing gear 58 rotatably mounted on the chassis 32 and engaging a drive-roll gear 60 mounted on the drive roll 14. In the pivot arm position 50 shown in FIG. 2, the planetary gear 56 engages the reversing gear 58. Consequently, the motor 28 drives the drive roll 14 by rotating in the clockwise direction: the motor 14 drives the first gear 36, which drives the second gear 40, which is on the same shaft as the sun gear 48, which rotates with it to drive the planetary gear 56 and thus the reversing gear 58 and the drive-roll gear 60.

It will be appreciated that when the motor drives its shaft 38 in the clockwise direction, the forces from gears 48 and 58 tend to keep the planetary gear 56 in engagement with the reversing gear 58 and thus prevent the pivot arm 50 from pivoting clockwise in FIG. 2. This is desirable because when the motor shaft 38 rotates counterclockwise, the unidirectional clutch 52 decouples the shaft 42 from the pivot arm 50, and thus would otherwise permit the planetary gear 56 to disengage from the reversing gear 58.

In order to decouple the motor 28 from the drive roll 14 when the paper 10 is to be rewound, the control circuit 30 pulses the motor 28 in the reverse direction, causing a momentary reversal of the first, second, sun, and planetary gears. The unidirectional clutch 52 does not permit shaft 42 to rotate clockwise with respect to the pivot arm. In response to the momentary reverse pulse on the motor, therefore, the unidirectional clutch couples the sun gear 48 to the pivot arm 50 by way of the shaft 42, thereby causing the pivot arm to pivot clockwise.

Motor inertia causes rotation of the motor shaft 38, together with that of the second, sun, and planetary gears, to continue after the pulse has ended until the pivot arm 50 encounters a stop pin 62 mounted on the chassis. The internal friction of the motor 28 then keeps the pivot arm 50 in this position until the motor is again activated in the reverse direction.

When the motor 28 is activated in the reverse direction, the unidirectional clutch 52 again decouples the sun gear 48 from the pivot arm 50 and so does not drive the pivot arm 50 counterclockwise. Because of the decoupling, however, the internal friction of the motor no longer keeps the pivot arm 50 in the disengaged position. Gravity therefore pulls the pivot arm 50 into the position in which the planetary gear 56 again engages the reversing gear 58, and the driving forces again hold the planetary gear 56 in engagement with the reversing gear 58. In this state, the pivot arm 50 is decoupled from the sun gear 48, so it does not present additional drag to the motor 28. This feature is obtained in a mechanism in which simple reversal of the motor decouples it from the drive roll.

Clearly, the present invention can be embodied in mechanisms that differ from that depicted in the drawings. For instance, the reversing gear 58 is merely an implementation detail that could be eliminated if the relative positions of the various gears were changed or the drive direction reversed. In fact, the first and second gears 38 and 40 could in principle be eliminated and the planetary gear engaged by a sun gear mounted directly on a motor coaxial with the pivot arm. The invention can thus be embodied in a wide variety of mechanisms.

What is claimed as new and desired to be secured by Letters Patent of the United States is:

1. A drive mechanism adapted for application of a drive torque thereto to drive a web forward in response to application of torque in one direction but permit relatively free movement of the web in response to application of torque in the other direction, the mechanism comprising:
   A. a chassis;
   B. a drive roll, rotatably mounted on the chassis and adapted for engagement by a web, for rotating to drive any web engaging the roll;
   C. a pivot arm having a planetary gear rotatably mounted thereon for rotation about a planetary-gear axis, the pivot arm being pivotably mounted to the chassis for pivoting, about a pivot axis spaced from the planetary-gear axis, between a first position, in which the planetary gear is coupled to the drive roll, and a second position, in which the planetary gear is decoupled from the drive roll;
   D. a sun gear adapted for driving by a power source, the sun gear being rotatably mounted for rotation about the pivot axis and driving engagement of the planetary gear to drive the planetary gear when driven by the power source; and
   E. a unidirectional clutch operatively connected between the pivot arm and the sun gear for coupling the pivot arm to the sun gear when the sun gear rotates in a first direction, in which engagement tends to pivot the pivot arm toward the second position, but for decoupling the sun gear from the pivot arm when the sun gear rotates in the other, second, direction, whereby the power source can drive the drive roll, without drag from the pivot arm, by operating in one direction but can be disengaged from the drive roll by operating in the other direction.

2. A drive mechanism as defined in claim 1 further including a drive shaft on which the sun gear is mounted for driving of the sun gear by rotation of the drive shaft, and wherein the clutch is operatively connected between the pivot arm and the sun gear by being fastened to the pivot arm and the drive shaft.

3. A drive mechanism as defined in claim 1 further including:
   A. a drive-roll gear on the drive roll for rotating the drive roll by driving the drive-roll gear; and
   B. a reversing gear engaging the drive-roll gear; and wherein, when the pivot arm is in its first position, the planetary gear is coupled to the drive-roll gear by engaging the reversing gear.

4. A drive mechanism as defined in claim 1 wherein the pivot arm is gravitationally biased, toward its first position.

5. A drive mechanism as defined in claim 1 further including a stop member on the chassis for preventing the pivot arm, when it pivots from the first position to the second position, from pivoting beyond the second position.

6. A drive mechanism as defined in claim 1 further including:

A. a motor coupled to the sun gear for driving thereof and operable by application of control signals thereto selectively to drive the sun gear in the first and second directions; and B. a control circuit for applying signals to the motor to drive the sun gear in the second direction and for applying signals to the motor to drive the sun gear in the first direction for only enough time to cause the pivot arm to pivot from the first position to the second position.

* * * * *